UNITED STATES PATENT OFFICE.

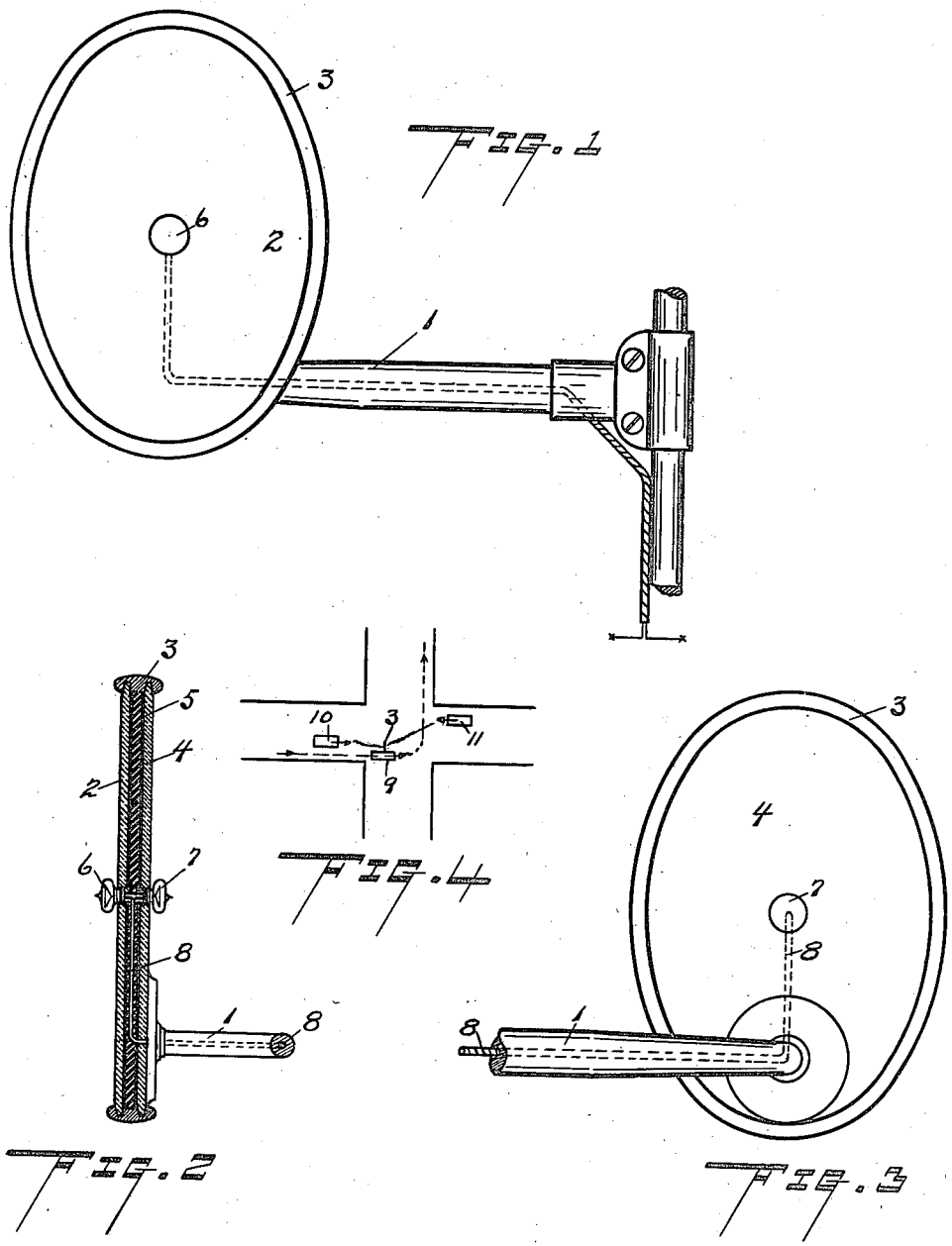

CARL W. RIEDEL, OF SAGINAW, MICHIGAN.

SIGNAL DEVICE.

1,195,734.        Specification of Letters Patent.        Patented Aug. 22, 1916.

Application filed September 4, 1915. Serial No. 48,963.

*To all whom it may concern:*

Be it known that I, CARL W. RIEDEL, a citizen of the United States, residing at Saginaw, in the county of Saginaw and State of Michigan, have invented certain new and useful Improvements in Signal Devices; and I do hereby declare the following to be a full, clear, and exact description of the invention, such as will enable others skilled in the art to which it appertains to make and use the same.

This invention relates to signal devices and pertains more particularly to signals adapted to be used on automobiles and similar vehicles to indicate to drivers of vehicles at the rear and also ahead that the signaling vehicle intends to turn.

The invention pertains more especially to a combined side or rear view mirror and a signaling lamp, whereby the objects of the invention are attained.

The invention consists in the devices described and claimed and the equivalents thereof.

In the drawings forming a part of the specification, Figure 1 is a view in elevation showing a side mirror with my improvement attached. Fig. 2 is a vertical cross section of the mirror. Fig. 3 is a rear view. Fig. 4 is a diagrammatic view representing the intersection of two streets and indicating the manner in which my improved signaling device is used in practice.

As is clearly shown in the drawings, the device consists in the usual side mirror bracket 1 secured to the frame of the vehicle and projecting, say, to the left of the driver's seat. Upon the bracket is mounted a rear view mirror 2 in any suitable or convenient manner. The frame 3 of the mirror carries two reflecting or mirror surfaces, one of which, the mirror 2 above referred to, presents to the driver a view of the road behind him, and the other surface 4 faces forward. The two mirrors 2 and 4 mounted in the frame 3, are preferably arranged with their backs spaced apart, and if desired, a suitable layer of packing or other material 5 is placed between them.

Each of the mirrors 2 and 4 is preferably perforated near its middle and in the hole so formed is mounted a small lamp. One of the lamps, as 6, projects from the mirror 2 toward the rear of the vehicle and the other lamp 7 projects forward. These lamps are preferably small electric lamps having their feed wires 8 passing through the space between the mirrors 2 and 4, sufficient of the packing 5 being removed to receive the wires 8 and these wires then pass into the vehicle, preferably through the hollow mirror bracket 1, to any suitable source of current, as a battery, in the circuit of which is located a suitable push button, not shown. The push button may be conveniently located near the driver's hand on the steering wheel of the vehicle. Closing the circuit will cause both of the lamps 6 and 7 to flash and the reflecting surfaces 2 and 4 will increase the brightness of the flash so that it will attract the attention of the drivers of vehicles at the rear of, or ahead of the signaling vehicle.

In practice I prefer to provide the lamps 6 and 7 with red or other suitably colored glass to produce a distinctive flash that will readily attract attention.

The usefulness of the device will be apparent from inspection of Fig. 4, where 9 is the signaling vehicle, 10 a vehicle at the rear and 11 a vehicle approaching from the opposite direction. If the driver of vehicle 9 wishes to turn the corner to the left he presses his signal button and lamp 6 flashes a signal to the driver of vehicle 10, and a lamp 7 flashes a signal to the driver of vehicle 11, warning them that the signaling vehicle 9 intends to turn to the left.

While I have shown and described a specific construction and arrangement of the two mirrors and a specific arrangement of the mounting of the two lamps 6 and 7, I do not desire to confine myself to this specific detail, as numerous modifications in the structure and arrangement of the parts may be made without departing from the spirit of my invention.

Having thus described my invention, what

I claim and desire to secure by Letters Patent is:

A signaling device for vehicles comprising a pair of plane mirrors arranged back to back and spaced apart, an opening through each mirror, a lamp having a socket removably received in each opening, electric conduits to each lamp, said conduits received between said mirrors and communicating with a source of current.

In testimony whereof, I affix my signature in presence of two witnesses.

CARL W. RIEDEL.

Witnesses:
   Geo. B. Willcox,
   Nellie M. Angus.